United States Patent [19]

Haskell et al.

[11] Patent Number: 4,589,018
[45] Date of Patent: May 13, 1986

[54] TECHNIQUE FOR THE TIME FREQUENCY MULTIPLEXING ON THREE TELEVISION SIGNALS

[75] Inventors: Barin G. Haskell, Tinton Falls; Robert L. Schmidt, Wanamassa, both of N.J.

[73] Assignee: AT&T Bell Laboratories, Murray Hill, N.J.

[21] Appl. No.: 500,957

[22] Filed: Jun. 3, 1983

[51] Int. Cl.$^4$ ............................................... H04N 7/08
[52] U.S. Cl. ........................................ 358/142; 370/50
[58] Field of Search ................. 358/142, 143, 144, 12, 358/16, 146; 370/50

[56] References Cited

U.S. PATENT DOCUMENTS

| | | | |
|---|---|---|---|
| 3,697,682 | 10/1972 | Berg | 178/6.8 |
| 4,205,339 | 5/1980 | Howe | 370/20 |
| 4,215,370 | 7/1980 | Kirk, Jr. | 358/146 |

OTHER PUBLICATIONS

Kiver, Milton S., "Color Television Fundamentals" 2nd edition McGraw-Hill, 1964; pp. 21–35.
Electronics Letters, vol. 9, No. 14, Jul. 12, 1973, "'Nearly Instantaneous' Digital Compander for Transmitting Six Sound-Programme Signals in a 2.048 Mbit/s Multiplex" by M. G. Croll et al., pp. 298–300.
BSTJ, vol. 60, No. 5, May–Jun. 1981, "Time-Frequency Multiplexing (TFM) of Two NTSC Color TV Signals–Simulation Results" by B. G. Haskell, pp. 643–660.
Int'l. Conf. on Communications Conference Record, vol. 2 of 4, Communications: The Expanding Resource, "Time-Frequency-Multiplexing (TFM) of Two NTSC Color TV Signals–Simulation Results" by B. G. Haskell, pp. 22.3.1–22.3.5.

Primary Examiner—John C. Martin
Assistant Examiner—David E. Harvey
Attorney, Agent, or Firm—Erwin W. Pfeifle

[57] ABSTRACT

The present invention relates to a technique for the Time-Frequency-Multiplexing (TFM) of three television signals. More particularly, three fields of a TV signal are sent simultaneously to a remote receiver by transmitting one field as is in the baseband of a standard television system signal while the other two fields are transmitted as differential signals, quadrature amplitude modulated onto a subcarrier frequency above baseband. The two differential signals can comprise two field differential signals or a frame and a field differential signal. Arrangements are also provided for transmitters and receivers for implementing the present technique.

17 Claims, 13 Drawing Figures

TECHNIQUE FOR THE TIME FREQUENCY MULTIPLEXING ON THREE TELEVISION SIGNALS

BACKGROUND OF THE INVENTION

1. Field of the Invention

The present invention relates to a technique for the Time Frequency Multiplexing (TFM) of three TV signals and, more particularly, to a technique for simultaneously transmitting three fields of a television picture signal by a Time Frequency Multiplexed signal where one field is transmitted in its original analog form in the baseband below 4.2. MHz, and the other two fields are transmitted as differential signals which are Quadrature Amplitude Modulated (QAM) onto a carrier above the baseband.

2. Description of the Prior Art

Time-Frequency-Multiplexing was originally proposed in the article "Time-Frequency Multiplexing (TFM) of Two NTSC Color TV Signals—Simulation Results" by B. G. Haskell in BSTJ, Vol. 60, No. 5, May–June 1981, at pages 643–660, for transmitting two broadcast quality color television signals on terrestrial microwave radio facilities. With TFM as then defined, two successive lines, or fields, of one picture would be frequency multiplexed so that they could be sent in one line, or field, period. During the next time interval, two successive lines, or fields, from the other picture would be transmitted, thus avoiding any crosstalk between pictures. In order to reduce the bandwidth required for the TFM signal, one of the two simultaneously transmitted lines, or fields, would be sent as a bandlimited differential signal, modulated onto a vestigial sideband (VSB) carrier frequency situated above the baseband video. The resulting TFM signal could then be transmitted through the microwave radio facility via narrow band FM.

The problem remaining in the prior art is to provide better use of the frequency spectrum by permitting the simultaneous transmission of more than two TV signals.

SUMMARY OF THE INVENTION

The foregoing problem has been solved in accordance with the present invention which relates to a technique for the Time Frequency Multiplexing (TFM) of three television signals and, more particularly, to a technique wherein three fields of a TV signal are sent simultaneously by transmitting one field as is in the baseband, and the other two fields are transmitted as differential signals which are Quadrature Amplitude Modulated (QAM) onto a carrier frequency above baseband.

It is an aspect of the present invention to provide a TFM technique which will enable the transmission of three color television signals through a satellite transponder comprising, for example, a 36 MHz bandwidth.

Other and further aspects of the present invention will become apparent during the course of the following description and by reference to the accompanying drawings.

DETAILED DESCRIPTION

In accordance with the present invention, three color television (TV) signals are simultaneously transmitted using a Time-Frequency-Multiplexing (TFM) technique. More particularly, three sequential field signals from a TV picture signal are simultaneously transmitted by sending a first field signal as is in the baseband while the second and third field signals are transmitted as differential signals which are Quadrature Amplitude-Modulated (QAM) onto a carrier frequency above baseband. For the following discussion it will be assumed that fields 1, 2 and 3 are sequential field signals of a TV picture which are to be simultaneously transmitted as described hereinabove.

Figure 1:
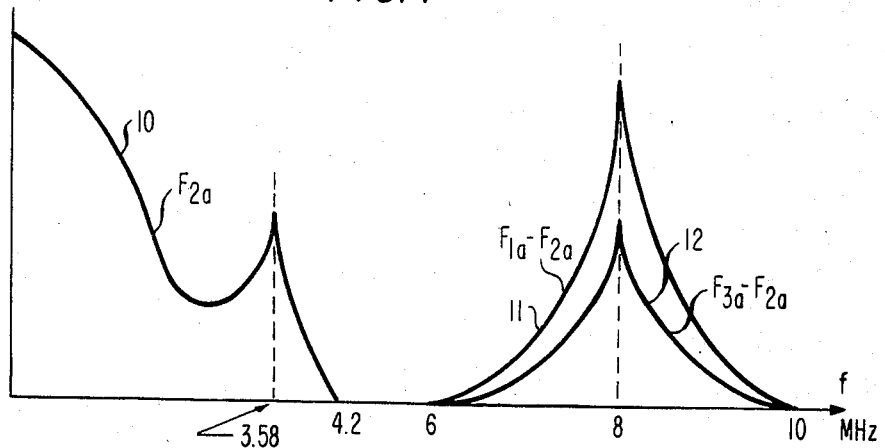
FIG. 1 illustrates a Time-Frequency-Multiplexing (TFM) signal in the frequency domain for one baseband field signal and two field-differential signals for an NTSC system signal in accordance with the present invention.

FIG. 1 shows a frequency spectrum of a signal in accordance with the present invention wherein field 2 of the picture signal from a source "a", designated $F_{2a}$ and indicated by the curve 10, is transmitted in its original analog form in the baseband, below 4.2 MHz for the standard National Television System Committee (NTSC) signal. Simultaneous therewith, a first field differential signal, designated $F_{1a}-F_{2a}$ (field 1 minus field 2 from the source "a" picture) and indicated by the curve 11, and a second field differential signal, designated $F_{3a}-F_{2a}$ (field 3 minus field 2 from the source "a" picture) indicated by the curve 12, are transmitted to the remote receiver. It is to be understood that a field difference signal is defined as the difference between two successive fields of a TV picture. In a typical sequence, three fields from the source "a" picture are transmitted simultaneously, followed by three fields from a source "b" picture, followed by three fields from a source "c" picture, followed again by three fields from a source "a" picture, etc. using the exemplary format of FIG. 1.

The two field differential signals might be defined as:

$$P_{X1}=\alpha B+(1-\alpha)(D+G-E)$$

$$F_1-F_2=X_1-P_{X1}'$$

$$P_{X3}=\alpha E+(1-\alpha)(A+C-B)$$

$$F_3-F_2=X_3-P_{X3}' \qquad (1)$$

Figure 2:
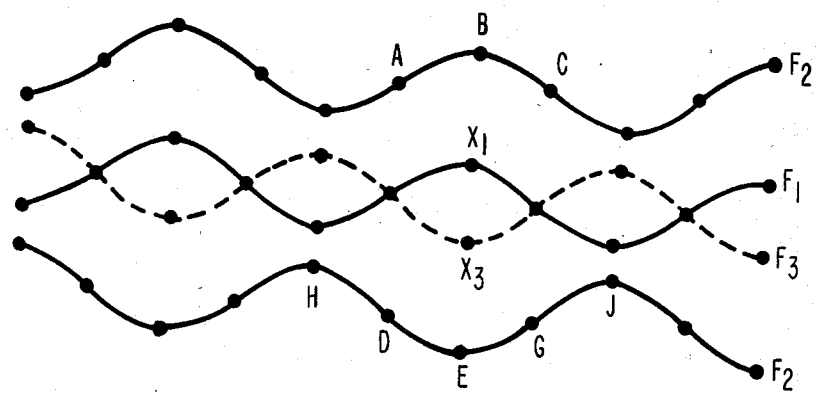
FIG. 2 illustrates interlaced lines from three successive fields with a color subcarrier.

It is to be understood that there are many ways of defining field difference signals, and for such purpose, reference should be made to FIG. 2 which shows interlaced NTSC lines from three successive fields $F_1$, $F_2$ and $F_3$, with the subcarrier phase as indicated and picture element (pel) locations, indicated by dots, corresponding to sampling at four times the color subcarrier frequency. $F_2$, of course, occurs in time after $F_1$, and, as shown in FIG. 2, lines of $F_1$ have the same color subcarrier phase as the corresponding lines directly above in $F_2$.

On the average, field difference signals are desired to be as small as possible. Thus, a field difference at pel $X_1$ might be defined by:

$$F_1-F_2=X_1-B \qquad (2)$$

This signal is zero in areas of uniform color and luminance. It is also zero for many electronically generated test signals. However, in areas of a TV picture containing very much detail the difference can be quite large.

Another definition involving pels of the same color subcarrier phase might be $$F_1-F_2=X_1-P_{X1} \qquad (3)$$

where $P_{X1}=\alpha G+(1-\alpha)/2 \, (H+J) \; 0.5\leq\alpha\leq 1$.

In this case $P_{X1}$ can be thought of as a prediction of pel $X_1$ based on an average of nearby pels of the same color subcarrier phase.

The main problem with Eq. (3) is that pels H and J are geometrically nearly twice as far from pel $X_1$ as is pel B. By using pels which are closer, such as in Eq. (1), the prediction of $P_{X1}$ may be improved. However, it may then sometimes be outside the range of $X_1$. Thus, prediction $P_{X1}$ should be peak limited, and this is indicated with a prime ($P_{X1}'$). For normal TV pictures, including text and graphics, the resulting field differential signal $$F_1-F_2=X_1-P_{X1}' \qquad (4)$$

is considerably smaller than those of equations (2) and (3). The equation for the differential signal $F_3-F_2$ in Eq. (1) can also be similarly derived.

Figure 3:
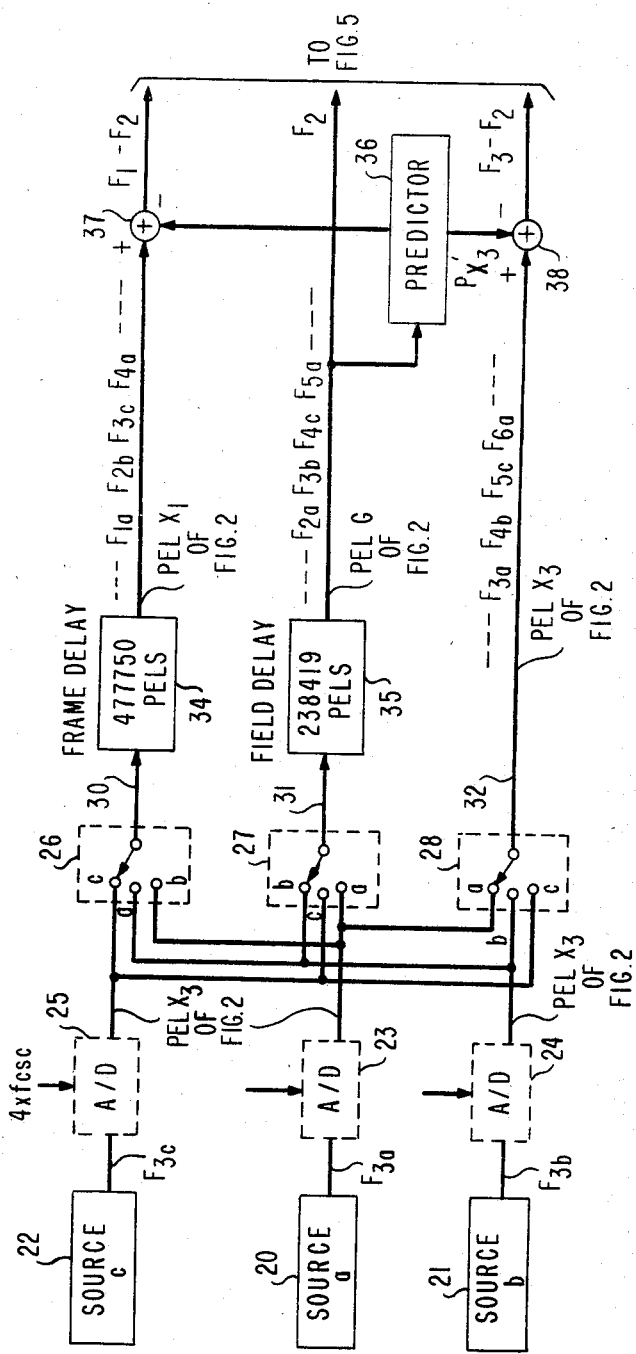
FIG. 3 is a block diagram of an uplink TDM for generating a baseband field signal plus two field differential signals for three TV sources in accordance with the present invention.
Figure 4:
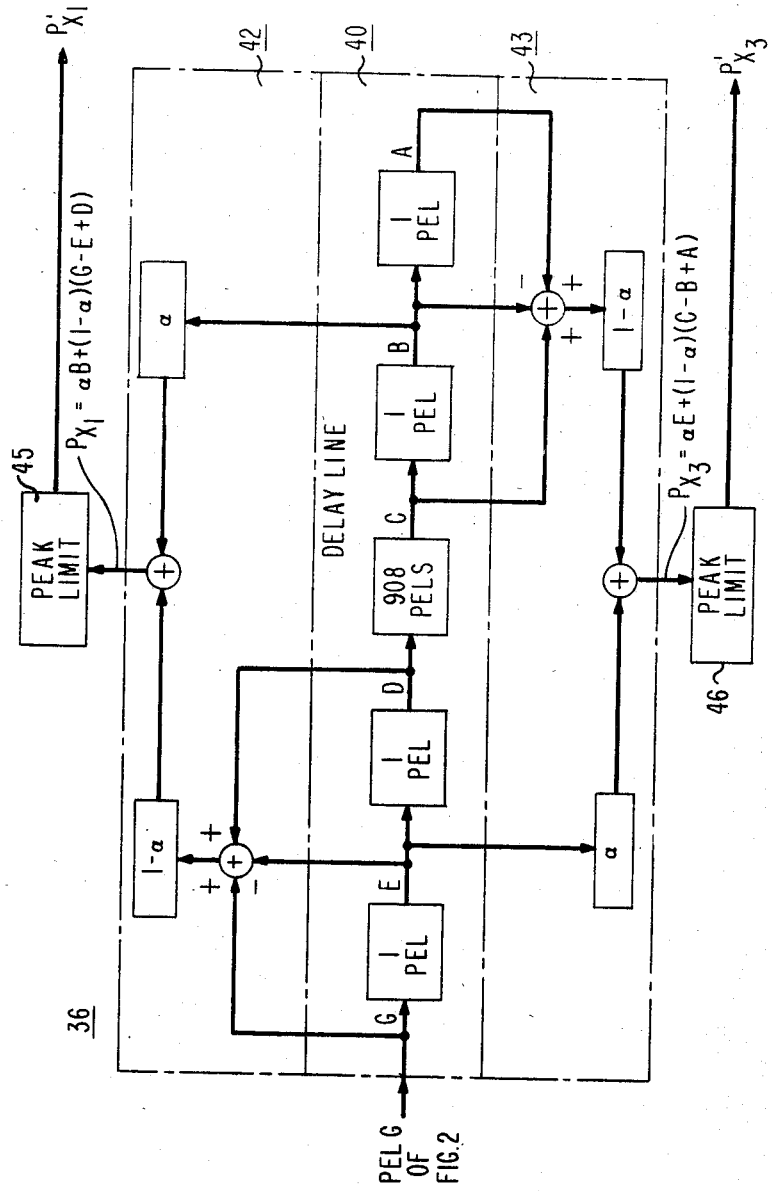
FIG. 4 is a block diagram of an exemplary predictor for use in FIGS. 3 and 7.
Figure 5:
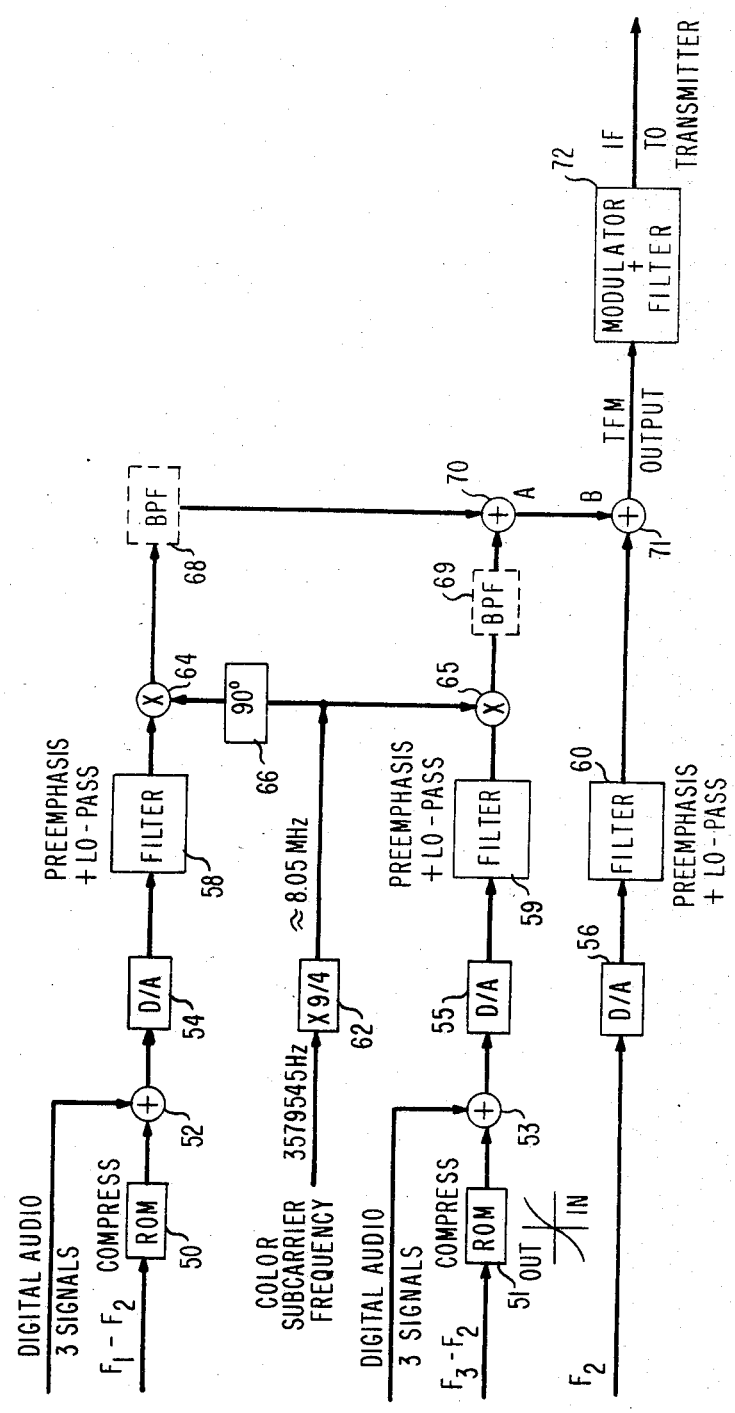
FIG. 5 is a block diagram of an exemplary arrangement for generating uplink TFM waveforms using the signals of FIG. 3.

An exemplary arrangement for implementing the transmitter section of the system just described is shown in FIGS. 3-5 for the case of colocated sources. FIG. 3 illustrates an exemplary arrangement for generating $F_2$ the uplink baseband signal of field 2 and the two field differential signals $F_1-F_2$ and $F_3-F_2$ from each of three colocated sources 20-22, designated sources a-c, respectively, for transmission over, for example, a satellite transponder. The TV output signals from sources 20-22 are shown as first being digitized in optional Analog-to-Digital Converters (A/D) 23-25, respectively, in order to simplify signal processing. The digitization may not be necessary if suitable analog components are used, e.g., CCD delays. It is to be understood in the arrangement of FIG. 3 that an exemplary sampling rate of four times the color subcarrier frequency, i.e., 14.3 MHz for an NTSC signal, is used.

The outputs from each of the three A/D converters 23-25 are terminated on a separate input terminal of each of three switching means 26-28 such that each of the corresponding input terminals are connected to a different one of the three A/D converter outputs. More particularly, the outputs from A/D converters 23-25 are connected to the (a) middle, bottom and top input terminals of switching means 26, respectively, (b) the bottom, top and middle input terminals of switching means 27, respectively, and (c) the top, middle and bottom input terminals of switching means 28, respectively. The three switching means 26-28 are arranged to move in synchronism from their top positions, to the middle position, to the bottom position, and back to the top position, etc. Switching means 26-28 also all change positions simultaneously preferably sometime during a vertical blanking period in such a way that complete fields of the input TV signal are routed to either the top, middle or bottom paths 30-32, respectively, at the output of switching means 26-28.

In FIG. 3, the top path 30 contains a delay means 34 which provides a delay of exactly one frame period of the exemplary NTSC signal, which is equal to 477,750 pels. From FIG. 2, this indicates that if an $X_3$ pel from field 3 appears at the input to delay means 34, which is comparable to a frame memory, an $X_1$ pel from field 1 will appear at its output. The middle path 31 contains a delay means 35 which provides a delay of exactly one field minus one-half line minus one pel of the exemplary NTSC signal, which is equal to 238,419 pels. From FIG. 2, this means that if an $X_3$ pel appears at the input to delay means 35, a G pel from field 2 will appear at its output. This arrangement of switching means 26-28 and delay means 34-35 ensures that during any one field period, three successive fields of only one source will be available at any instant of time for processing and transmission, as indicated by the sequence of labeled fields in FIG. 3. More particularly, when the switching means 26-28 connect their top terminals to each output, switch 26 allows the signal from source 22 (source "c") to enter delay means 34. During the next field when switching means 26-28 connect their middle terminals to each output, the previous field signal from source 22 has traveled approximately half-way through delay means 34 while a second field from source 22 (source "c") enters delay means 35. Finally, when switching means 26-28 connect their bottom terminals to each output, a third field from source 22 (source "c") enters path 32 while concurrent therewith the first and second fields from source 22 exit from delay means 34 and 35, respectively. This description can similarly be applied to three fields from each of sources 20 and 21.

In FIG. 3, a predictor 36 produces the peak-limited predictions $P_{X1}'$ and $P_{X3}'$ defined, for example, in Equation (1). Details of an exemplary arrangement of predictor 36 are shown in FIG. 4. Essentially, predictor 36 comprises a 912-pel tapped delay line 40, a first and a second arithmetic logic circuit 42 and 43 which computes $P_{X1}$ and $P_{X3}$, respectively, and, finally, a first and a second peak clipping circuit 45 and 46 to ensure that the predictions $P_{X1}$ and $P_{X3}$, respectively, fall in the same range as the original pels. The taps from tapped delay line 40, used by the logic circuits 42 and 43, are in accordance with the appropriate one of Eq. (1).

Returning to FIG. 3, the outputs $P_{X1}'$ and $P_{X3}'$ from predictor 36 are subtracted in subtractors 37 and 38, respectively, from the respective outputs of delay means 34 and switching means 28 to provide the $F_1-F_2$ and $F_3-F_2$ differential signals, respectively. The three output signals from FIG. 3 are then combined to form the TFM signal of FIG. 1 in an exemplary transmitter shown in FIG. 5.

In FIG. 5, the differential signals $F_1-F_2$ and $F_3-F_2$ from, for example, the arrangement of FIG. 3 are first passed through Read-Only-Memories (ROMs) 50 and 51, respectively, which perform the first half of a companding operation. The input-output relationship of each of ROMs 50 and 51 has a compression type characteristic, as shown in FIG. 5 below ROM 51. Companding the differential signals greatly improves the Signal-To-Noise Ratio (SNR) of the received TV signals.

With three TV sources, each producing, for example, stereo audio, a total of six audio waveforms must also be transmitted. Thus, three digital audio signals are inserted into the horizontal blanking period of each differential signal. If the three TV sources are precisely synchronized with horizontal blanking periods aligned, there is little problem. Each audio signal requires sampling at approximately 32 kHz, and with near-instantaneous companding, 10 bits per sample are sufficient. Therefore, it is here suggested that the audio be sampled at twice the TV line scan rate, and that a doublet of two samples from each audio in each horizontal blanking period be sent. For this, seven multilevel pulses per doublet could be used, i.e., 21 pulses per blanking period. At a baud rate of exactly 4/7 color subcarrier frequency, approximately 2.05 MHz, three audio signals plus one or two pulses for timing would approximately fill the horizontal blanking period of approximately 11.4 $\mu$sec for an NTSC system signal.

There are several ways of mapping the 20+ bits from each doublet into seven multilevel pulses. For example, 3-bits per pulse could be used which would allow 20 bits for sample amplitudes and one bit per doublet for the near instantaneous audio companding function. Since audio compander segment values need only be sent every 30 samples or so, one bit per doublet allows approximately 15 bits for segment value, synchronization, parity, etc., which seems more than sufficient.

It may be desirable to protect the companding bit to a greater extent than the audio amplitude bits. For example, a two-level pulse might be used to send the companding bit, thus leaving six pulses to transmit the 20 amplitude bits. Unequal assignment of bits to pulses can be employed without much sacrifice of audio SNR. Alternatively, 10-bits could be used for one sample of the audio doublet, while the other might be sent as a difference using only 8 bits. This would enable the six pulses to send the audio doublet using only three bits per pulse.

If the three TV sources are not precisely aligned and horizontal blanking periods do not overlap, then there are two possibilities for audio transmission. If the sources are colocated, then the digital audio data might be buffered using fairly small memories to smooth the discontinuities in transmission rate. If the sources are non-colocated, then such buffering is not feasible.

In the case of non-colocated sources, video and audio signals from a given source must be sent in the same time slot via Time Division Multiple Access (TDMA), i.e., three fields of video and three fields of audio must be transmitted simultaneously in one field period. This requires that field memories be provided for the audio as well as the video, but otherwise there is no difficulty in sending the digital audio in the horizontal blanking period in a way similar to that described heretofore.

In FIG. 5, the digital audio signals are added to the outputs from ROMs 50 and 51 in adders 52 and 53, respectively. If the digital audio baud rate is exactly 4/7ths the color subcarrier frequency and the video sampling rate is four times the color subcarrier frequency, then each audio pulse can conveniently be formed from seven video samples having the appropriate value. The resulting $F_1-F_2$ differential plus audio signal and the $F_3-F_2$ differential plus audio signal can then be converted to analog by D/A converters 54 and 55, respectively, as can the baseband $F_2$ signal by D/A converter 56. The D/A converters 54-56 can, for example, be 14 MHz D/A converters.

The outputs from D/A converters 54-56 are transmitted to the inputs of low-pass filters 58-60, respectively. Filters 58 and 59 are low-pass filters with cutoff frequencies of approximately 2 MHz, while filter 60 has a cutoff frequency of approximately 4.2 MHz. All filters 58-60 are indicated as including preemphasis, which is usually implemented as an attenuation of frequencies below a few hundred kHz. Preemphasis serves to reduce the peak value of the signal which is sustained for more than several microseconds, which in turn reduces the sustained FM peak deviation and the accompanying distortion due to IF filtering.

A predetermined QAM carrier frequency is chosen, which, for example, is shown in FIG. 5 as being exactly 9/4ths the color subcarrier frequency of an NTSC system color signal. Such carrier frequency is easily obtainable at the transmitter and receiver and gives a fairly comfortable guard band between the QAM signal and the baseband $F_2$ waveform. In FIG. 5, this carrier frequency is obtained by passing the color subcarrier frequency available at the transmitter through a 9/4 multiplying circuit 62 to provide the exemplary 8.05 MHz carrier signal.

The differential signals from filters 58 and 59 are then quadrature modulated in mixers 64 and 65, respectively, where the carrier signal to mixer 64 is shown as being phase shifted by 90 degrees in phase shifter 66 while the carrier frequency is directly applied to mixer 65. With ideal mixing no further processing is required. However, if square law devices are used, optional bandpass filtering is needed after the mixing operation, as shown by optional filters 68 and 69.

It is to be understood that filters 58-60 could, in principle, be implemented digitally prior to D/A converters 54-56 as well as mixers 64 and 65, using, for example, a "multiplying D/A converter" which is presently available. Additionally, if the QAM carrier frequency were to be reduced to twice the color subcarrier frequency, then digital mixing would only involve multiplication by 0 and $\pm 1$. However, the guard band between QAM and baseband signals would also be reduced, requiring filters 58-60 to have sharper cutoffs. Still further, it is also possible to preemphasize directly at the outputs of the TV sources and in such case preemphasis would not be needed in filters 58–60. Also, a bandpass filter with a sufficiently sharp cutoff as well as flat amplitude and delay characteristics could be disposed directly after adder 70 permitting filters 58 and 59 to be removed.

In FIG. 5, the resulting differential signals are added in an adder 70 and the combined differential signals are added to the baseband signal in adder 71. The TFM output signal from adder 71 thus consists of a QAM component which carries two video differential signals as well as audio, and a baseband component which carries one field of video. The TFM signal is frequency modulated (FM) onto, for example, an IF carrier in modulator and filter 72 for transmission via a microwave radio facility (terrestrial or satellite) to the remote receiver.

Figure 6:
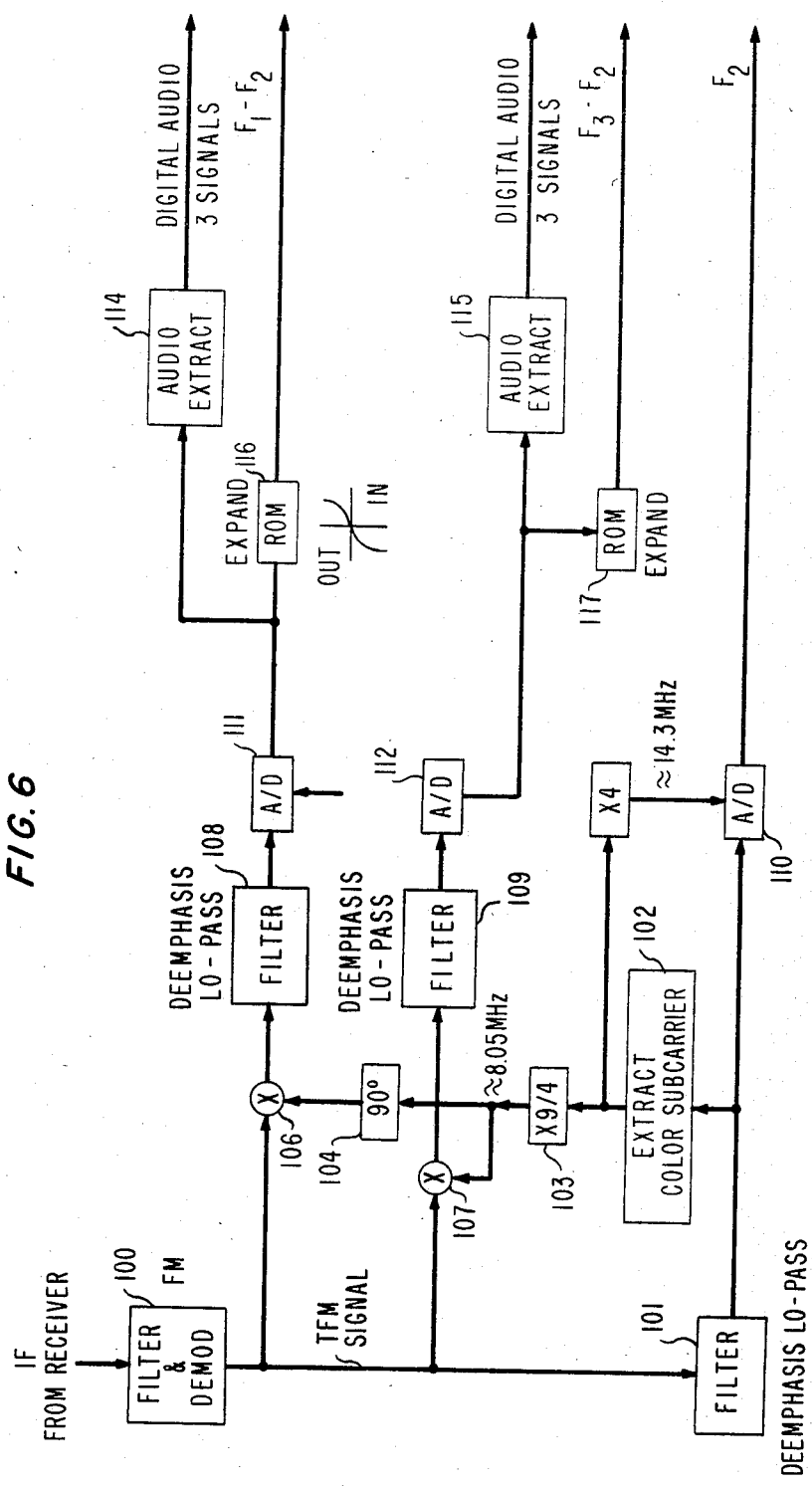
FIG. 6 is a block diagram of an arrangement for decomposing a downlink waveform corresponding to the output from FIG. 5.

After the present TFM signal is transmitted through the exemplary satellite, the signal is received in a receiver in accordance with the present invention. FIG. 6 shows an arrangement for decomposing the received TFM signal into its audio and video components. In FIG. 6, a demodulator 100 produces a composite downlink TFM signal, which passes to an arrangement which essentially is the inverse of FIG. 5. More particularly, the demodulated TFM is passed through a low-pass filter 101 which picks off the baseband portion of the signal and deemphasizes it, thus undoing the preemphasis introduced by filter 60 of FIG. 5. Following this, the color subcarrier frequency is extracted by filtering means 102 which can, for example comprise a gated phase-locked-loop. Multiplication of the color subcarrier frequency by 9/4ths and phase locking, possibly to one of the audio bit-timing pulses, in circuit 103 produces the exemplary QAM carrier frequency of approximately 8.05 MHz. A 90 degree phase shift in phase shifter 104 produces its quadrature.

Mixers 106 and 107 produce low-pass versions of the two quadrature signals in the received demodulated TFM signal, and filters 108 and 109 reject out-of-band components and deemphasize, thus undoing the preemphasis provided by filters 58 and 59 of FIG. 5. The three signals from filters 101, 108 and 109 are then digitized at a sampling rate of 4 times the color subcarrier frequency in A/D converters 110, 111, and 112, respectively. The bottom path in FIG. 6 produces digital signal $F_2$ directly. In the upper and middle paths, the audio is extracted by circuits 114 and 115, respectively, and the $F_1-F_2$ signal in the top path and the $F_3-F_2$ signal in the middle path are passed through ROMs 116 and 117, respectively, which each have an expanding characteristic as shown in the graph below ROM 116, thus performing the second half of a companding operation and undoing the effects of ROMs 50 and 51 of FIG. 5. The outputs of ROMs 116 and 117 are the digitized differential signals $F_1-F_2$ and $F_3-F_2$, respectively.

Figure 7:
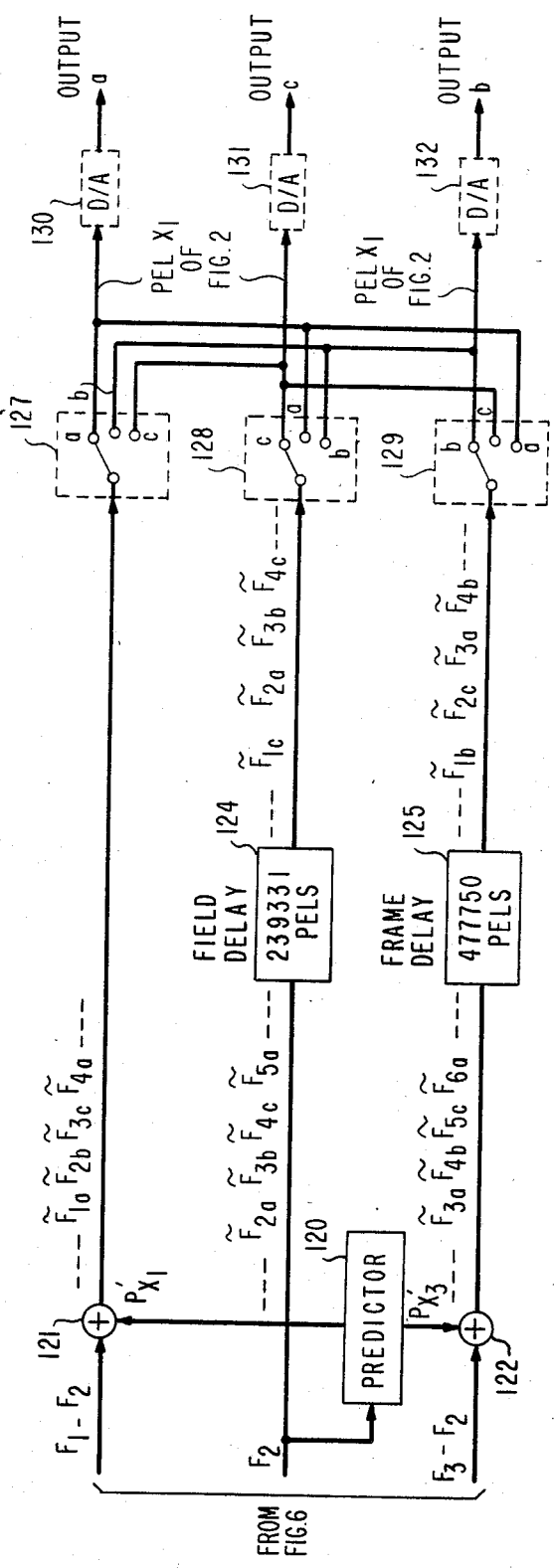
FIG. 7 is a block diagram of an exemplary downlink Time-Division-Demultiplexer for recovering the three TV source signals from the output of FIG. 6.

The resultant three signals from FIG. 6 pass in digital form to the receiver time-division-demultiplexer shown in FIG. 7. Again, it must be understood that digital processing may not be necessary if suitable analog components are used. In FIG. 7, predictor 120 is the same as predictor 36 of FIG. 3, and the two adders 121 and 122 combine the predictions from predictor 120 with the $F_1-F_2$ and $F_3-F_2$ differential signals, respectively, in order to recover the original fields as shown. Tildes are used for the source fields on the three paths to indicate that, due to transmission distortions and noise, the received waveforms are not identical to those at the source in FIG. 3, but instead are approximations which are sufficiently close for the present application.

The middle path in FIG. 7, associated with the $F_2$ field, includes a delay means 124 for providing a delay of exactly one field plus one-half line plus one pel, or approximately 239,331 pels. From FIG. 2, this means that if a G pel appears at the input to delay means 124, then an $X_1$ pel will appear at its output. The bottom path in FIG. 7 includes a delay means 125 which provides a delay of approximately one frame, or 477,750 pels, and, as before, from FIG. 2 if an $X_3$ pel appears at the input to delay means 125, then an $X_1$ pel appears at its output.

The three switching means 127, 128 and 129 disposed in the top, middle and bottom paths, respectively, in FIG. 7, function as described for switching means 26–28 of FIG. 3. More particularly, switching means 127–129 all change positions simultaneously sometime during the vertical blanking period in such a way that complete fields from the top, middle, and bottom paths are routed, respectively, to their appropriate outputs. The output digital signals are routed to the appropriate source "a", "b" or "c" via optional D/A converters 130–132, respectively.

Figure 8:
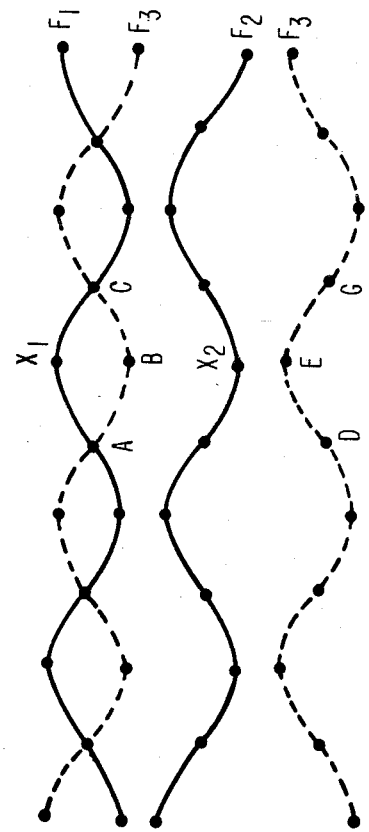
FIG. 8 illustrates interlaced lines from three successive fields with a color subcarrier for generating a field-differential and a frame-differential signal.

TFM of three TV sources can also be carried out by sending a baseband field signal and a frame differential signal plus a field differential signal on the QAM carrier, where a frame differential signal is defined as the difference between two fields which are separated by one frame period. The TFM signal spectrum is similar to that of FIG. 1, except that, for example, field 3 is sent in the baseband below 4.2 MHz and fields 1 and 2 are sent as differential signals on the QAM carrier. It is to be understood that the roles of fields 1 and 3 could be interchanged. Using the pel definitions shown in FIG. 8, the differential signals can be defined as:

$$P_{X2} = \alpha B + (1-\alpha)(D+G-E)$$

$$F_2 - F_3 = X_2 - P_{X2}'$$

$$P_{X1} = A + C - B$$

$$F_1 - F_3 = X_1 - P_{X1}' \tag{5}$$

Figure 9:
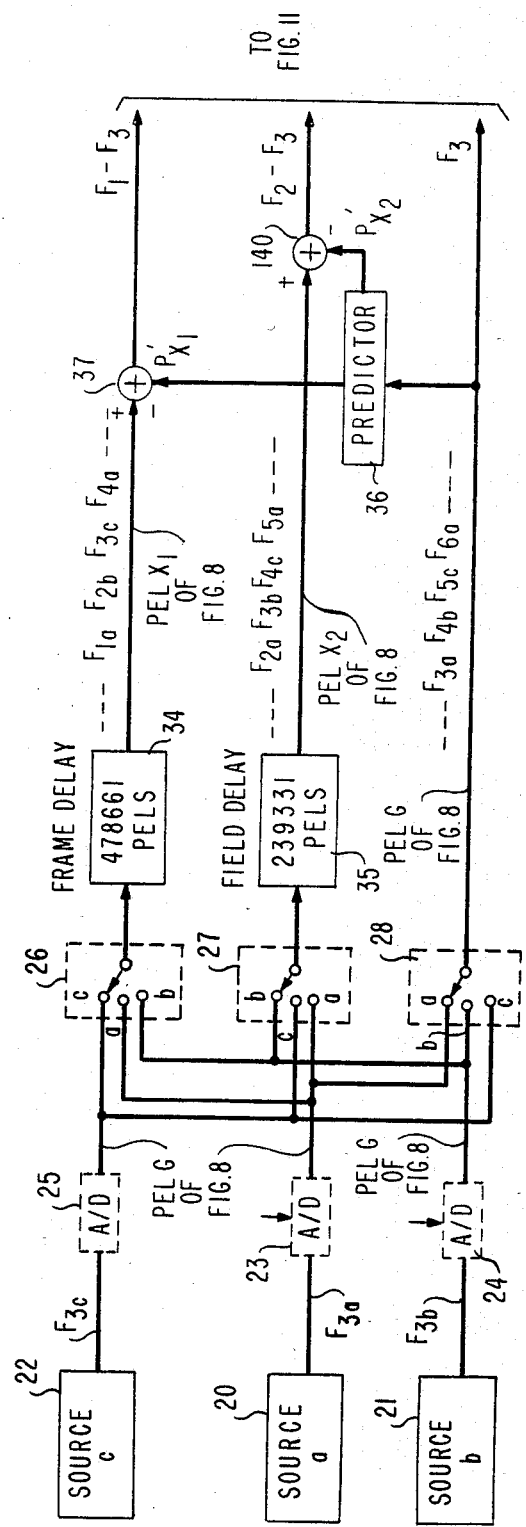
FIG. 9 is a block diagram of an exemplary uplink Time-Division Multiplexer for generating a baseband signal plus a field-differential and a frame-differential signal for three TV sources in accordance with the present invention.
Figure 10:
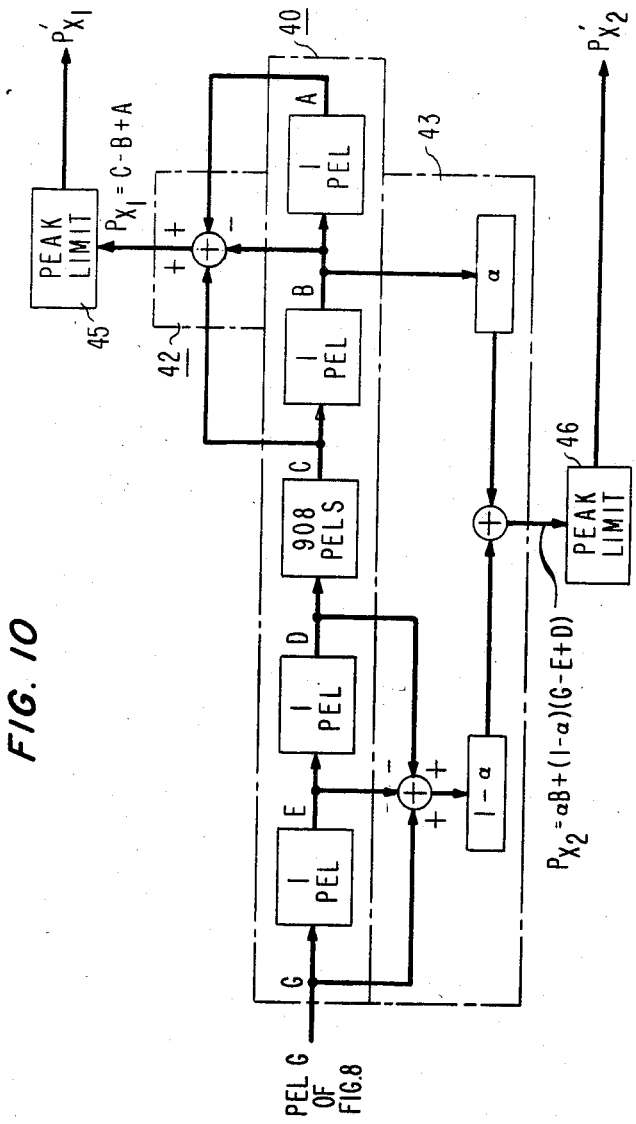
FIG. 10 is a block diagram of an exemplary predictor for use in FIGS. 9 and 11.
Figure 11:
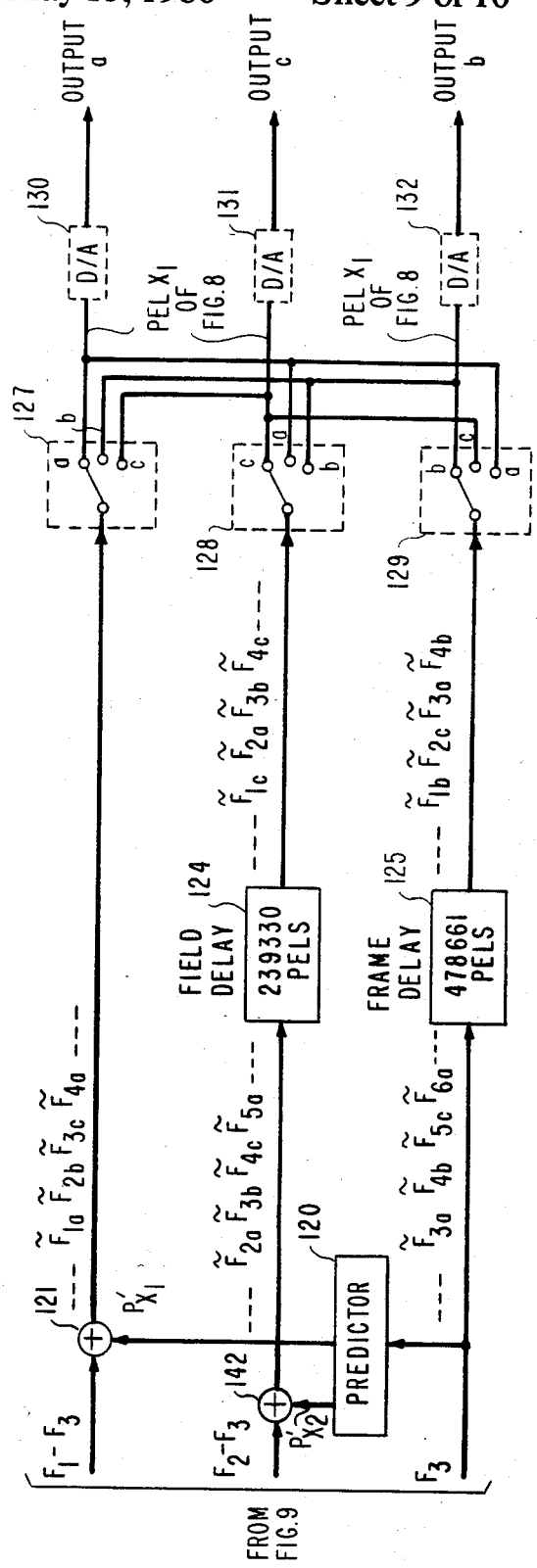
FIG. 11 is a block diagram of an exemplary downlink Time-Division-Demultiplexer for recovering the three TV source signals when generated in accordance with FIG. 9.

The arrangement for implementing the system for transmitting a baseband field signal and a frame differential signal plus a field differential signal on a QAM carrier is shown in FIGS. 9–11 and is very similar to that shown in FIGS. 3, 4 and 7, respectively, except that delay means 34 and 35 in FIG. 9 and delay means 124 and 125 in FIG. 11 include different delays than found in the corresponding delay means in FIGS. 3 and 7. More particularly, in FIG. 9, delay means 34 and 35 include delays of 478,661 and 239,331 pels, respectively, with the top path generating the frame differential signal $F_1-F_3$, the middle path generating the field differential signal $F_2-F_3$, and the bottom path generating the field signal $F_3$. To generate such fields in FIG. 9, the arrangement of FIG. 3 was modified to delete subtractor 38 in the bottom path of FIG. 3, and a subtractor 140 was added in the middle path to subtract the $P_{X2}'$ output from predictor 36 from the output of delay means 35 in accordance with equation (5) in order to generate the field differential signal.

With regard to the difference between FIGS. 4 and 10, logic circuits 42 and 43 have different arrangements as shown to generate the different predictor outputs defined by equations (1) and (5). With regard to the differences between FIGS. 7 and 11, in FIG. 11 delay means 124 and 125 include delays of 239,330 and 478,661 pels, respectively. To appropriately process the input signals in the middle and bottom paths of FIG. 11, an adder 142 is disposed in the middle path to add the $F_2-F_3$ field differential signal and the $P_{X2}'$ output from predictor 120 while the $F_3$ input field signal is applied directly to the input of delay means 125.

Figure 12:
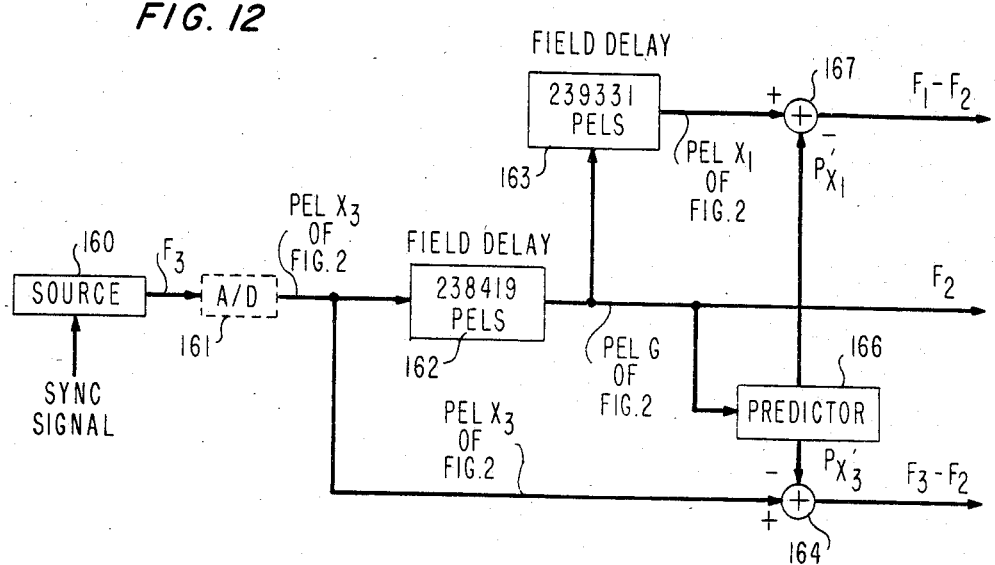
FIG. 12 is a block diagram of an arrangement for generating an uplink baseband signal plus two field-differential signals when TV sources are non-colocated.

If the uplinks are non-colocated, then some additional considerations apply. For example, the uplink system of FIG. 3 can be modified to the arrangement shown in FIG. 12 in order to save memory. Since a separate TFM signal is being sent from each non-colocated source, the three successive fields from one source 160 are sent through an optional A/D converter 161. The individual three fields are then transmitted to a delay means 162 in the middle path, having a delay of 238,419 pels, and a subtractor 164 in the bottom path. The output from delay means 162 is the $F_2$ field and is sent to a second delay means 163 in the top path, a predictor 166 and the $F_2$ output. Predictor 166 corresponds in function and circuitry to that of a predictor 36 in FIGS. 3 and 4. The output from delay means 163 in the top path is transmitted to a subtractor 167 where the resulting $P_{X1}'$ signal from predictor 166 is subtracted from the output of delay means 163 to generate the $F_1-F_2$ field differential signal. Finally, the $P_{X3}'$ output signal from predictor 166 is subtracted from the output from A/D converter 161 in subtractor 164 to generate the $F_3-F_2$ field differential signal. The resulting 3 output signals from FIG. 12, associated with three successive fields from source 160 can then be inputted to the arrangement of FIG. 5. Therefore, the main difference with the arrangement of FIG. 3 is that, in FIG. 12, the input switches are unnecessary and one less field memory is required. However, the three uplinks from the separated sources have to be synchronized with each other using any suitable synchronizing technique known in the art.

Figure 13:
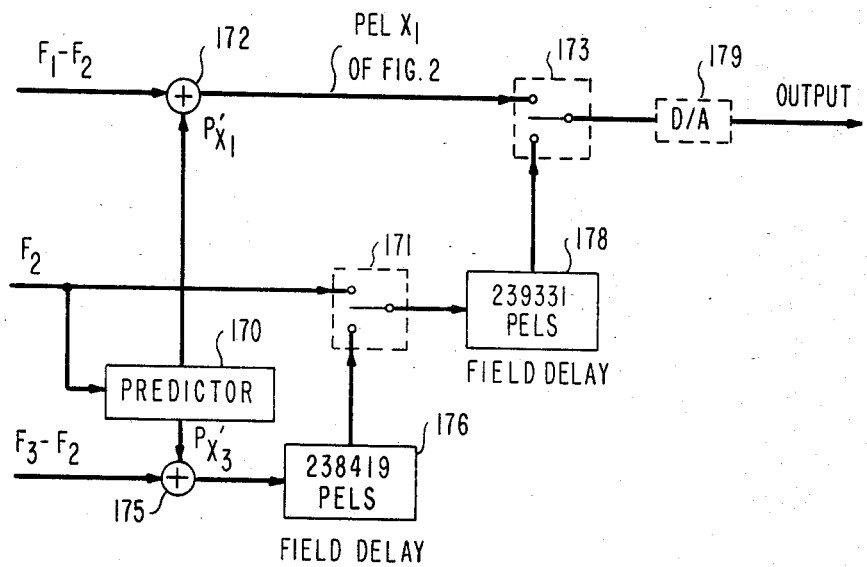
FIG. 13 is a block diagram of an arrangement for recovering three fields from a downlink baseband signal plus two field-differential signals when the receivers are non-colocated.

A similar savings in memory is possible in the downlink system shown in FIG. 13 when the receivers are non-colocated. More particularly, the outputs from FIG. 6 associated with a particular source are directed into the arrangement of FIG. 13. There, the $F_2$ field signal is directed to a predictor 170 and a SPDT switching means 171. The $P_{X1}'$ output from predictor 170 is added to the $F_1-F_2$ field differential signal in an adder 172 and the resultant signal transmitted to a second SPDT switching means 173. Concurrent therewith, the $P_{X3}'$ output from predictor 170 is added to the $F_3-F_2$ field differential signal in an adder 175 with the resultant output signal being transmitted to a delay means 176 having a delay of 238,419 pels. The output from delay means 176 is transmitted to a second input terminal of switching means 171 with the output from switching means 171 being inputted to a second delay means 178 having a delay of 239,331 pels. The output from delay means 178 is terminated on a second input terminal of switching means 173 with the output from switching means 173 being transmitted through an optional D/A converter 179 to the end user.

In operation, switching means 171 and 173 are in their up position for the field period during which signals $F_1-F_2$, $F_2$, and $F_3-F_2$ from a particular source are received. For the next two field periods while other source signals would be received, these switching means are in their down position. As explained previously, switching takes place at some convenient time during a vertical blanking period. Synchronization for non-colocated downlinks in a satellite system is essentially the same as for colocated downlinks, the main difference being that only one TV signal is produced by the former.

In most satellite systems, however, precise synchronization of non-colocated TV sources is not practical. Thus, it would be very desirable to have a sizable guard time between different source transmissions in order to minimize the possibility of interference between signals. For the video alone, there would be little problem since the vertical blanking period provides a very adequate guard time. However, since the audio is normally sent during the horizontal blanking period of every scan line including those in the vertical blanking period, the allowable guard time would have to be reduced considerably to accommodate video and audio transmission in this manner.

A convenient alternative is to cease audio transmission altogether for most of the vertical blanking period and save the accumulated audio data in a buffer of appropriate size. Then, near the end of the vertical blanking period, when there are whole lines of null differential signals, the entire contents of the buffer can be transmitted in a single burst of data pulses lasting less than four line periods. This enables the first 17 lines of the vertical blanking period to be used as a guard time, which is considerably larger than the approximate 50 microseconds which would be available otherwise.

It is to be understood that the above-described embodiments are simply illustrative of the principles of the invention. Various other modifications and changes may be made by those skilled in the art which will embody the principles of the invention and fall within the spirit and scope thereof. More particularly, the present techniques could be applied to non-NTSC color TV signals. Additionally, although with Phase Alternation Line (PAL) system signals the color subcarrier phase is not the same as with NTSC, by a slight shift in the sampling pattern from line to line, the same differential signals can be defined and the same transmission system can be used.

What is claimed is:

1. A method of simultaneously transmitting first, second and third successive fields of a television picture signal from a first television source followed by the simultaneous transmission of three successive fields of a television picture signal from a second television source and then the simultaneous transmission of three successive fields of a television picture signal from a third television source, the method comprising the steps of:
   (a) concurrently receiving the first, second or then third successive fields of the television picture signals from the first, second and third television sources and sequentially routing (i) said first concurrently received fields from the first, second and third television sources over a first, a second and a third separate path, respectively, (ii) said second concurrently received fields from the first, second and third television sources over the second, third and first separate path, respectively, and (iii) said third concurrently received fields from the first, second and third television sources over the third, first and second separate path, respectively;
   (b) delaying each of the field signals propagating in the first and one of the other two separate paths for a time period corresponding to at least one field period of a television picture signal to provide concurrent field signals associated with any one of the first, second and third television sources on the first, second and third separate paths;

(c) subsequent to step (b), generating from concurrent fields of the television picture signal associated with a particular television source on the first, second and third separate paths, a first output signal comprising one of the fields of the television picture signal as is found on one of the three separate paths, a second output signal comprising a first differential signal derived from concurrent fields of the television picture signal on said one of the three separate paths and a second one of the three separate paths, and a third output signal comprising a second differential signal derived from concurrent fields of the television picture signal on said one of the three separate paths and a third one of the three separate paths;

(d) transmitting the first output signal as is in the baseband of a standard television system signal;

(e) simultaneously with step (d), transmitting the second output signal comprising the first differential signal modulated via quadrature amplitude modulation (QAM) onto a subcarrier frequency above said baseband; and (f) simultaneously with step (d), transmitting the third output signal comprising the second differential signal modulated via QAM onto said subcarrier frequency above said baseband with a different quadrature component than said first differential signal.

2. A method of simultaneously transmitting first, second and third successive fields of a first television picture signal followed by successive fields of a second and then a third television picture signal according to claim 1 wherein in step (d) the first output signal is a field signal and in steps (e) and (f), each of said first and second differential signals are separate field differential signals.

3. A method of simultaneously transmitting first, second and third successive fields of a first television picture signal followed by successive fields of a second and then a third television picture signal according to claim 1 wherein in step (d) the first output signal is a field signal and in steps (e) and (f), said first and second differential signals are a frame differential and a field differential signal, respectively.

4. A television signal transmitter comprising:

switching means responsive to a concurrent reception of first, second and then third successive fields of three television picture signals from first, second and third television sources for sequentially routing (a) said concurrent first, fields from the first, second and third television sources over a first, second and third separate path, respectively, (b) said concurrent second fields from the first, second and third television sources over the second, third and first separate path, respectively, and (c) said concurrent third fields from the first, second and third television sources over the third, first and second separate paths respectively, first delay means disposed in the first separate path for providing a delay approximately equal to the time period for two of the successive fields of the television picture signal from a television source, second delay means disposed in the second path for providing a delay approximately equal to the time period for one of the successive fields of the television picture signal from a television source;

means (36–38, FIG. 3, 64–66, FIG. 5, 36–37, 140, FIG. 9 and 164, 166, 167, FIG. 12) for concurrently generating from the signals from the first and second delay means and the signal on the third path, a first output signal comprising one of said fields of the television picture signal as is found on one of the three separate paths in the baseband of a standard television system signal, a second output signal which comprises a first differential signal derived from said one and a second of said fields of the television picture signal found on the one of the three separate paths and a second one of the three paths, which second output signal is modulated via quadrature amplitude modulation (QAM) onto a subcarrier frequency above said baseband, and a third output signal which comprises a second differential signal derived from said one and a third of said fields of the television picture signal found on the one of the three separate paths and a third one of the three paths, which third output signal is modulated via QAM onto said subcarrier frequency above said baseband with a different quadrature component than said first differential signal; and means (FIG. 5) for combining the concurrent first, second and third output signals from the generating means associated with each of the three television sources into a transmitter output signal including a time division multiplexed format for the three television sources for transmission to a remote receiver.

5. A transmitter according to claim 4 wherein said first and second differential signals are first and second field differential signals, respectively.

6. A transmitter according to claim 4 wherein said first and second differential signals are a frame differential signal and a field differential signal, respectively.

7. A transmitter according to claim 4 wherein the generating means comprises:

means responsive to a field signal propagating in the second path for generating a first prediction of a predetermined pel of the field signal in the second path based on an average of a first group of nearby pels, and a second prediction of a predetermined pel of the field signal in the second path based on an average of a second group of nearby pels;

first means for subtracting said first prediction from the field signal propagating in the first path for generating a first field differential signal; and second means for subtracting said second prediction from the field signal propagating in the third path for generating a second field differential signal.

8. A transmitter according to claim 4 wherein the generating means comprises:

means responsive to the field signal propagating in the third path for generating a first prediction of a predetermined pel of the field signal in the third path based on an average of a first group of nearby pels, and a second prediction of a predetermined pel of the field signal in the third path based on an average of a second group of nearby pels;

first means for subtracting said first prediction from the field signal propagating in the first path for generating a frame differential signal; and second means for subtracting said second prediction from the field signal propagating in the second path for generating a field differential signal.

9. A transmitter according to claim 4 wherein the generating means comprises;
   means responsive to a field signal propagating in the first path for generating a first prediction of a predetermined pel of the field signal in the first path based on an average of a first group of nearby pels, and a second prediction of a predetermined pel of the field signal in the first path based on an average of a second group of nearby pels;
   first means for subtracting said first prediction from the field signal propagating in the second path for generating a field differential signal; and
   second means for subtracting said first prediction from the field signal propagating in the third path for generating a frame differential signal.

10. A television signal receiver responsive to an input signal from a predetermined remote transmitter during each period of a time division sequence, the input signal during each of the time division sequence periods comprising concurrent first, second and third signals associated with three successive fields of a television picture signal of either one of a first, second or third television picture source, where said first signal includes a first one of said fields of the television picture signal transmitted as is in the baseband of a standard television system signal, said second signal including a first differential signal derived from said first one and a second one of said fields of said television picture signal modulated via Quadrature Amplitude Modulation (QAM) onto a subcarrier frequency above said baseband and said third signal including a second differential signal derived from said first one and a third one of said fields of said television picture signal modulated via QAM onto said subcarrier frequency with a different quadrature component than said first differential signal, the receiver comprising:
   means (FIG. 6) for separating the first, second and third signals of the input signal into the baseband, first differential and second differential signal, respectively, associated with a predetermined television source for propagation along respective first, second and third paths; and
   means (120–122,124,125,127–129 FIG. 7; 120,121,142,124,125,127–129 FIG. 11; 170–173,175,176,178, FIG. 13) responsive to the baseband, first differential and second differential signals from the separating means for generating therefrom the first, second and third successive fields of a television picture signal associated with a television picture source for sequential transmission to a predetermined end user, the generating means comprising:
   means responsive to the baseband, first differential and second differential signals from the separating means for converting the first and second differential signal into the second and third successive fields of a television picture signal, respectively, from a predetemined television picture source for propagation along the second and third paths, respectively,
   means disposed after the converting means in two of the three paths for separately delaying each of the demodulated field signals propagating therein by a time period equal to at least the time period for one of the successive fields of a television picture signal to provide concurrent first, second and then third fields from the three television picture signals on the first, second and third paths, and
   switching means, disposed in the first, second and third paths after the delaying means, for routing the first, second and then third fields of the three television picture signals to each of a separate one of a first, second and third end user, respectively.

11. A receiver according to claim 10 wherein said first and second differential signals are first and second field differential signals, respectively.

12. A receiver according to claim 10 wherein said first and second differential signals are a field differential signal and a frame differential signal, respectively.

13. A receiver according to claim 11 wherein said second field of a television signal is received as is in the first signal, said first field differential signal is received as a differential between the first and second field signal in the second signal of the input signal, and said second field differential signal is received as a differential between the third and second field signals in the third signal of the input signal, and the converting means of the generating means comprises:
   means (120, FIG. 7; 170, FIG. 13) responsive to the second field of a television picture signal propagating in the first path for generating therefrom a first prediction of a predetermined pel of said second field of a television picture signal based on an average of a first group of nearby pels, and a second prediction of a predetermined pel of said second field of a television picture signal based on an average of a second group of nearby pels;
   first means (121 FIG. 7; 172, FIG. 13) for subtracting said first prediction from the first differential signal propagating in the second path for generating the first field of a television picture signal; and
   second means (122, FIG. 7; 175, FIG. 13) for subtracting said second prediction from the second differential signal propagating in the third path for generating the third field of a television picture signal.

14. A receiver according to claim 13 wherein the delay means of the generating means further comprises:
   first delay means (124, FIG. 7; 178, FIG. 13) for providing a delay to the second field of a television signal approximately equal to the time period for one of said television picture field signals; and
   second delay means (125, FIG. 7, 176,178, FIG. 13) for providing a delay to the third field of a television signal approximately equal to the time period of two of said television picture field signals.

15. A receiver according to claim 12 wherein said third field of a television picture signal is received as is in the first signal of the input signal, said frame differential signal is received as a differential between the first and third television picture field signals in the third signal of the input signal, and the field differential signal is received as a differential between the second and third television picture field signals in the second signal of the input signal; the converting means of the generating means comprising:
   means (120, FIG. 11) responsive to the third field of a television picture signal propagating in the first path for generating therefrom a first prediction of a predetermined pel of said third field of the television picture signal based on an average of a first group of nearby pels, and a second prediction of a predetermined pel of said third field of the television picture signal based on an average of a second group of nearby pels;

first means (121, FIG. 11) for subtracting said first prediction from the received frame differential signal propagating in the third path for generating the first field of the television picture signal; and second means (142, FIG. 11) for subtracting said second prediction from the received field differential signal propagating in the second path for generating the second field of the television picture signal.

16. A receiver according to claim 12 wherein said first field of a television picture signal is received as is in the first signal of the input signal, said field differential signal is received as a differential between the first and second field of the television picture signal in the second signal of the input signal, and the frame differential signal is received as a differential between the first and third fields of the television picture signal in the third signal of the input signal; the converting means of the generating means comprising:

means responsive to the first field of the television picture signal propagating in the first path for generating therefrom a first prediction of a predetermined pel of said first field of the television picture signal based on an average of a first group of nearby pels, and a second prediction of a predetermined pel of said first field of the television picture signal based on an average of a second group of nearby pels;

first means for subtracting said first prediction from the received field differential signal propagating in the second path for generating the second successive field of the television picture signal; and second means for subtracting said second prediction from the received frame differential signal propagating in the third path for generating the third successive field of the television picture signal.

17. A receiver according to claim 16 wherein the delay means of the generating means further comprises:

first delay means disposed to provide a delay to the second field of the television picture signal in the second path approximately equal to the period of one television picture field; and second delay means disposed to provide a delay to the third field of the television picture signal propagating in the third path equal to the period of approximately two television picture fields.

* * * * *